June 3, 1941. J. J. DELANEY 2,244,552
FLUID METER
Filed Feb. 6, 1939
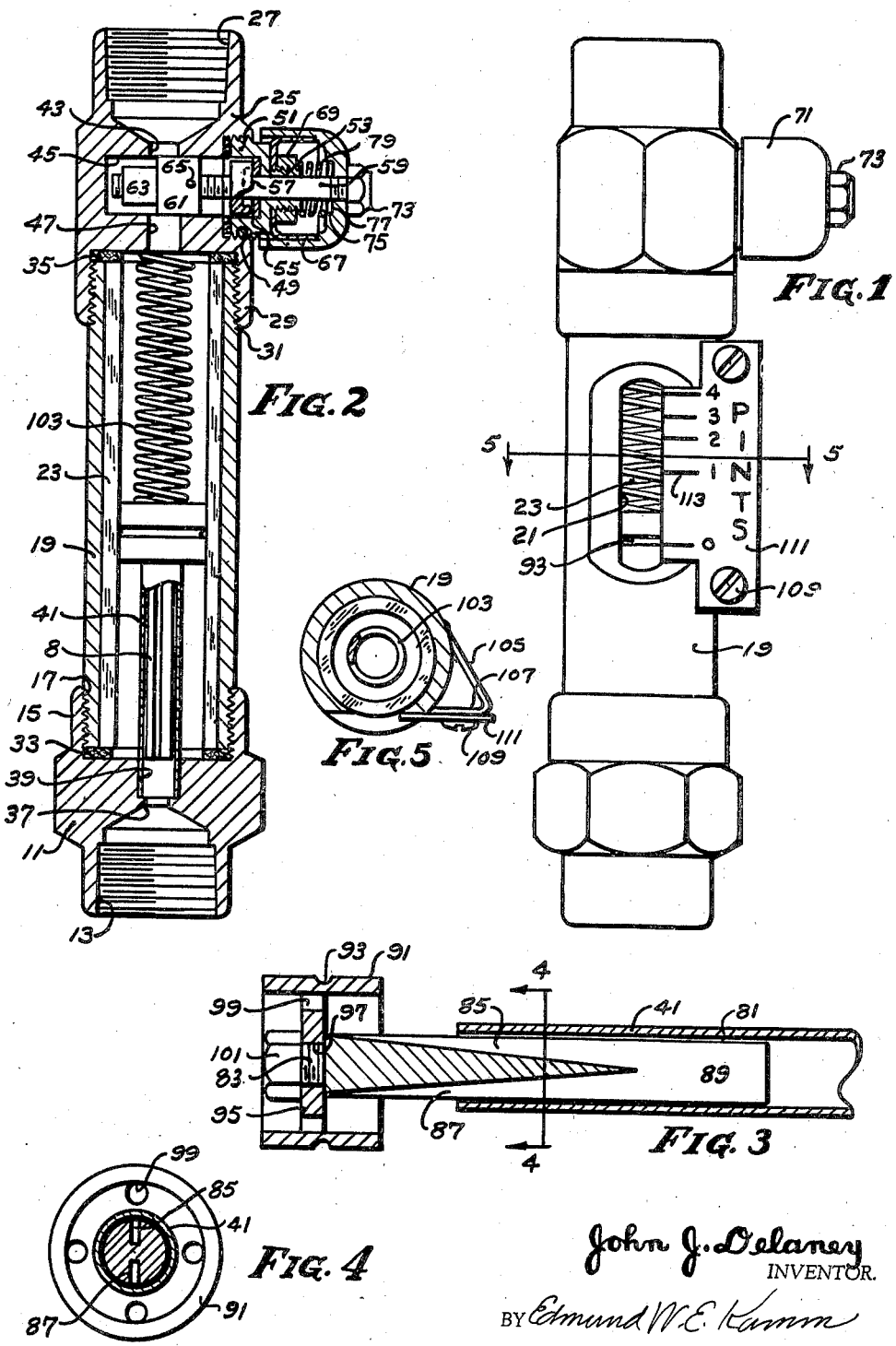
John J. Delaney
INVENTOR.
BY Edmund W. E. Kamm
ATTORNEY.

Patented June 3, 1941

2,244,552

UNITED STATES PATENT OFFICE 2,244,552

FLUID METER

John J. Delaney, Fort Wayne, Ind., assignor to S. F. Bowser & Company, Incorporated, Fort Wayne, Ind., a corporation of Indiana Application February 6, 1939, Serial No. 254,833

3 Claims. (Cl. 73—208)

This invention relates to a device for indicating the rate of flow of a liquid through a conduit. More specifically, it relates to a mechanism adapted to indicate to an observer the rate of flow of lubricant to a bearing or other part in pints per minute.

An object of the invention is to provide an indicator which will adjust itself quickly, smoothly and accurately to the proper indicating position when the rate of flow changes.

Yet another object of the invention is to provide an indicator which is actuated by a metering pin in a tube.

A further object of the invention is to provide a metering pin and tube construction which will operate smoothly and accurately.

Yet a further object of the invention is to provide a metering pin which has the same general cross-section as its associated metering tube and which has a slot of varying depth to provide the required orifice variation.

Other objects will become apparent from a study of the specification in connection with the drawing which are attached thereto and which form a part thereof, in which:

Figure 1 is an elevation of the invention showing the sight glass, indicator and scale.

Figure 2 is a vertical section of the invention showing the details of the manual orifice and the indicating apparatus.

Figure 3 is an enlarged section of the metering pin, tube and indicator showing the slots in the pin.

Figure 4 is a sectional view taken on line 4—4 of Figure 3 showing the slotted construction of the metering pin.

Figure 5 is a sectional view taken on the line 5—5 of Figure 1 showing the mounting for the indicator.

Referring to Figure 2, the numeral 11 represents the inlet fitting which is provided with a threaded inlet opening 13 adapted to be joined with a lubricating pump by suitable tubing, not shown. The fitting is provided with an upwardly directed circular flange 15, which is internally threaded at 17 to receive the lower end of a threaded nipple 19. The nipple is cut away as shown at 21 (Figure 1) to expose a transparent tube 23 which is fitted inside of the nipple 19.

An outlet fitting 25, having an internally threaded outlet 27, is provided with a downwardly depending flange 29 which is internally threaded at 31 to receive the upper end of the nipple 19. Gaskets 33 and 35 are seated in the flanges 15 and 29 respectively and are adapted to sealingly engage the ends of the transparent tube 23 to prevent leakage of lubricant from the device.

Referring to the fitting 11, an opening 37 of reduced diameter communicates with the threaded inlet opening 13 on the one end with an enlarged counterbore 39 at the other end. A metering tube 41 is pressed or otherwise fixed into a counterbore 39. In the outlet fitting 25 a reduced opening 43 communicates at one end with the threaded outlet opening 27 and at the other or lower end with a horizontal transverse bore 45.

A second opening 47 of reduced diameter communicates at its upper end with the transverse bore 45 and at its lower end with the passage in the transparent tube 23. Bore 45 is open only at one end and this end is counterbored and internally threaded as indicated at 49 to receive a plug 51 which is provided with an externally threaded boss 53.

Plug 51 is counterbored at 55 to receive a disc of a relatively hard composition made of synthetic rubber and containing cork which composition is known as "Corprene" or other material which fits loosely on stem 59 and a metal flange fixed to the stem which has a peripheral axially directed bead adapted to bear on the disc to form a rotary seal. The boss 53 is perforated axially to receive said valve stem. The valve stem is provided with a short thread at its outer end and a long thread at its inner end. A valve comprising a cylindrical member 61 of the diameter of the bore 45, and a second cylindrical member 63 having a diameter less than that of the bore, is internally threaded to receive the inner end of the valve stem 59. A pin 65 inserted radially in the element 61 rides in a groove, not shown, in the bore 45 and prevents the valve from rotating about its axis.

A pair of spring fingers 67 is held in place on boss 53 by means of a nut 69 and serves to engage the interior of a hollow adjusting knob 71 which is held in place on the valve stem by means of a nut 73 threaded thereon. A pin 75, which passes diametrically through the valve stem, is seated in a groove 77 in the knob and held in seated position by the nut 73 so that rotary motion of the knob will be transmitted to the valve shaft.

A spring 79 is compressed between the nut 69 and the knob 71 and serves to hold the valve shaft in the outermost position so that the rotary seal 57 will engage and seal the perforation in plug 51 through which the valve stem passes. The spring fingers 67 serve to hold the knob 71 in its adjusted position. The element 61 of the valve has sufficient axial length to control and entirely close off the openings 43 and 47.

Referring now to Figures 3 and 4, the metering tube 41, which is preferably cylindrical in form, is provided with a metering pin 81 which has a diameter of from one to three thousandths of an inch less than the internal diameter of the tube. The metering pin is free to move axially of the tube and is provided at its upper end with a reduced threaded portion 83.

Two diametrically opposed longitudinally extending triangular slots 85 and 87 are formed in the metering pin 81. These slots merge at the lower end of the metering pin and become a single transverse slot 89 extending entirely across the metering pin. It will be seen, therefore, that by sliding the metering pin in and out of the tube 41, orifices of varying area will be formed at the outlet of the tube.

A plunger 91, which is cylindrical in shape, fits loosely within the bore of the transparent tube 23 and is provided with an annular groove 93 which may be colored distinctively in order to be readily distinguished through the liquid. The plunger is provided with a transverse web 95 which is centrally perforated at 97 to receive the threaded portion 83 of the metering pin. The web 95 is perforated at 99 to permit ready passage of lubricant through the plunger. A nut 101 serves to hold the plunger on the metering pin. A spring 103 extends between the upper fitting 25 and the top of the plunger 91 and tends to urge said plunger to its lowermost position.

A vertically extending angle 105 is welded or otherwise fixed to the nipple 19. The angle is so attached that one leg 107 thereof extends inwardly substantially tangent to the transparent tube 23. The leg 107 is provided with threaded openings adapted to receive screws 109 which hold the indicator plate 111 in position, so that the graduations 113 thereon may be readily compared with the groove 93 on the plunger.

Various indicator plates may be provided so that the lubricator may be used with oils of various viscosities. As shown, the indicator plate is calibrated in pints per minute, but obviously this measure may be varied to suit the condition.

*Operation*

In operation, the valve 61—63 is adjusted by manually rotating the knob 71 to the right or left to close or open the valve respectively. The position of this valve governs the amount of lubricant which will pass through the inlet 13, metering tube 41 and passages 85 and 87 in the metering pin, through passages 99 in the plunger and the openings 47 and 43 to the outlet 27. For each setting of the valve 61—63, pressure on the lubricant will force the metering pin 81 to assume a particular position in the metering tube 41.

If the viscosity of the lubricant is constant, the position of the metering pin in the tube will give an accurate indication of the rate of flow of the liquid for which the instrument was calibrated. Thus an operator, by adjusting the valve 61—63, may regulate the position of the meter pin 81 by observation of the groove 93 of the plunger through the sight opening 21. By adjusting the valve until the groove 93 corresponds with a calibration 113 on the indicator plate 111, the operator can select the particular rate of flow of lubricant which he desires to pass to the part to be lubricated.

Should it be necessary to utilize a lubricant having different viscosity, in order to use the same sight feed lubricator, it is necessary merely to exchange the indicator plate 111 for one which is calibrated in accordance with the viscosity of the oil used. The flow of lubricant may be entirely cut off by moving the valve 61—63 to its innermost position.

While applicant has disclosed a preferred embodiment of his invention, he does not desire to be limited to the exact details of construction shown and described for the reason that various forms, arrangements and constructions of parts will occur to a person skilled in the art. Accordingly, he desires protection within the scope of the appended claims.

What I claim to be new and desire to protect by Letters Patent of the United States is:

1. In a fluid meter, means forming inlet and outlet conduits, a tube, comprising transparent wall means, connecting said conduits, an indicator mounted for movement in said tube, a metering tube connected with said inlet, a metering pin mounted for movement in said metering tube and connected to operate said indicator, said pin being provided with a longitudinally and radially extending slot of constant width but of varying radial depth adapted to form with said metering tube an orifice of varying area as said pin moves in said tube.

2. In a fluid meter, a metering tube, a metering pin adapted to closely fit in said tube but mounted for movement with respect thereto, means forming diametrically opposed longitudinal grooves of constant width but increasing in radial depth to form orifices of increasing area with the end of said tube as the pin moves out of the tube, and an indicator connected to be moved by said pin.

3. In a fluid meter, inlet and outlet fittings, a conduit comprising transparent wall means connecting said fittings, a cylindrical metering tube of constant diameter fixed in said inlet fitting to conduct fluid into said conduit, a metering pin closely fitted for movement in said tube, an indicator connected to said metering pin and disposed to be visible through said wall, said metering pin being provided with longitudinally and radially extending slots of constant width but of varying radial depth adapted to form a variable orifice with the end of said tube.

JOHN J. DELANEY.